(12) United States Patent
Märk

(10) Patent No.: US 11,092,190 B2
(45) Date of Patent: Aug. 17, 2021

(54) TELESCOPIC STEERING SHAFT WITH A PULL-OUT SAFEGUARD

(71) Applicants: THYSSENKRUPP PRESTA AG, Eschen (LI); thyssenkrupp AG, Essen (DE)

(72) Inventor: Robert Josef Märk, Feldkirch (AT)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 370 days.

(21) Appl. No.: 16/308,718

(22) PCT Filed: Jun. 16, 2017

(86) PCT No.: PCT/EP2017/064783
§ 371 (c)(1),
(2) Date: Dec. 10, 2018

(87) PCT Pub. No.: WO2017/216351
PCT Pub. Date: Dec. 21, 2017

(65) Prior Publication Data
US 2019/0145456 A1    May 16, 2019

(30) Foreign Application Priority Data

Jun. 17, 2016 (DE) ..................... 10 2016 111 178.3
Nov. 2, 2016 (DE) ..................... 10 2016 221 451.9

(51) Int. Cl.
*F16C 3/03* (2006.01)
*F16D 3/06* (2006.01)
(Continued)

(52) U.S. Cl.
CPC ................. *F16C 3/03* (2013.01); *B62D 1/16* (2013.01); *B62D 1/20* (2013.01); *F16D 3/06* (2013.01);
(Continued)

(58) Field of Classification Search
CPC .......... F16C 3/03; F16C 2326/24; B62D 1/16; B62D 1/20; F16D 3/06; F16D 3/40;
(Continued)

(56) References Cited

U.S. PATENT DOCUMENTS 2,605,622 A * 8/1952 Anderson ............. F16C 33/306
4,941,862 A * 7/1990 Hazebrook ............. B25B 13/06
(Continued)

FOREIGN PATENT DOCUMENTS

CN           1122156 A      5/1996
CN         202806852 U      3/2013
(Continued)

OTHER PUBLICATIONS

English Translation of International Search Report issued in PCT/EP2017/064783, dated Sep. 26, 2017.

*Primary Examiner* — Greg Binda
(74) *Attorney, Agent, or Firm* — thyssenkrupp North America, LLC

(57) ABSTRACT

A steering shaft having an outer shaft and an inner shaft accommodated therein in a torque-locking, axially displaceable manner and an axial inner stop which projects radially outwards from an outer face of the inner shaft. When the inner shaft is pulled out of the outer shaft, the axial inner stop strikes against an axial outer stop projecting radially inwards from an inner face of the outer shaft, wherein the axial displacement of the inner shaft is limited in the pull-out direction. With regard to simple production of the outer stops with the least possible deformation of the entire cross section of the outer shaft, the outer stop is introduced by at least one forming process into an end portion of the outer shaft, wherein the axis of the direction of introduction in each case forms an angle of more than 20° with the radial direction of the outer shaft.

8 Claims, 6 Drawing Sheets

(51) Int. Cl.
 *B62D 1/16* (2006.01)
 *B62D 1/20* (2006.01)
 *F16D 3/40* (2006.01)

(52) U.S. Cl.
 CPC ............ *F16C 2326/24* (2013.01); *F16D 3/40* (2013.01); *Y10T 29/49641* (2015.01); *Y10T 29/49929* (2015.01); *Y10T 403/32475* (2015.01); *Y10T 403/32501* (2015.01)

(58) Field of Classification Search
 CPC ....... Y10T 403/32475; Y10T 29/49641; Y10T 29/49929; Y10T 403/32501
 USPC ......................................................... 464/162
 See application file for complete search history.

(56) References Cited

U.S. PATENT DOCUMENTS

| | | | |
|---|---|---|---|
| 5,290,974 A * | 3/1994 | Douglas | ............. F01N 13/1805 |
| 5,507,203 A | 4/1996 | Audibert | |
| 5,813,794 A | 9/1998 | Castellon | |
| 5,830,071 A * | 11/1998 | Castellon | ................... F16C 3/03 464/162 |
| 6,585,602 B2 * | 7/2003 | Cermak | ................... F16C 3/035 |
| 7,607,855 B2 * | 10/2009 | Lai | ....................... A63C 11/221 403/109.5 |
| 9,157,482 B2 | 10/2015 | Vasicek | |
| 2005/0194775 A1 * | 9/2005 | Bastein | .................. B62D 1/185 |
| 2008/0000316 A1 | 1/2008 | Kurokawa | |
| 2014/0080614 A1 | 3/2014 | Nabeshima | |

FOREIGN PATENT DOCUMENTS

| | | |
|---|---|---|
| CN | 103671590 A | 3/2014 |
| DE | 197 15 744 A | 10/1997 |
| DE | 102004009188 A | 9/2005 |
| DE | 19648998 B | 2/2014 |
| EP | 1 873 038 A | 1/2008 |
| WO | 2012076073 A | 6/2012 |

\* cited by examiner

TELESCOPIC STEERING SHAFT WITH A PULL-OUT SAFEGUARD

CROSS REFERENCE TO RELATED APPLICATIONS

This application is a U.S. National Stage Entry of International Patent Application Serial Number PCT/EP2017/064783, filed Jun. 16, 2017, which claims priority to German Patent Application No. DE 10 2016 221 451.9, filed Nov. 2, 2016 and German Patent Application No. DE 10 2016 111 178.3, filed Jun. 17, 2016, the entire contents of which are incorporated herein by reference.

FIELD

The present disclosure generally relates to a steering shaft for a motor vehicle having an outer shaft part.

BACKGROUND

A generic steering shaft is disclosed in U.S. Pat. No. 9,157,482 B2. A drawback with this solution is the complicated and costly introduction of caulking into the front face of the outer shaft.

Thus, a need exists for an improved pull-out safeguard for a steering shaft which is able to be produced in a simple manner.

SUMMARY

The invention relates to a steering shaft for a motor vehicle having an outer shaft part, in which an inner shaft part is accommodated in a torque-locking and axially adjustable manner, having at least one axial inner stop which projects radially outwards from the outer face of the inner shaft part and which, when the inner shaft part is pulled out of the outer shaft part, strikes against at least one axial outer stop which projects radially inwards from the inner face of the outer shaft part, such that the axial displacement path of the inner shaft part in the outer shaft part is limited in the pull-out direction.

In some examples, the outer stop is introduced by at least one forming process into an end portion of the outer shaft part, wherein the axis of the direction of introduction in each case forms an angle of more than 20° with the radial direction of the outer shaft part.

If, for the forming process, the outer shaft part were to be acted upon directly by a forming tool in the radial direction, the outer shaft part could be deformed as a whole and become jammed on the inner shaft part, so that the inner shaft part would no longer be displaceable in a simple and smooth manner in the outer shaft part and considerable forces would have to be applied for the displacement. The measure according to the invention, however, has the advantage that during the forming process for producing the outer stop only a reduced radial component of the forming force of the respective tool acting in the direction of introduction acts in the radial direction and thus the risk of significant and undesired deformation of the outer shaft part is considerably reduced. Advantageously, therefore, the force required for displacing the inner shaft part in the outer shaft part remains small.

Although, in principle, the invention may be implemented by a single inner stop of the inner shaft part which cooperates with a single outer stop of the outer shaft part, for reasons of symmetry and in order to prevent canting or distortion of the two shaft parts an arrangement may be preferred where two inner stops are arranged on the inner shaft part and two outer stops assigned to the inner stops are arranged on the outer shaft part in the peripheral direction at a spacing of 180°. The invention, however, also encompasses embodiments in which three, four or more inner stops cooperate with a corresponding number of outer stops.

Preferably, the angle is less than 80°, particularly preferably the angle is less than 60°. In an ideal case, the angle comprises a value of between 40° and 50°. As a result, the influence of the radial force component acting during production may be further reduced so that the force which is required for displacing the inner shaft relative to the outer shaft after producing the outer stop substantially corresponds to the force for displacing the inner shaft relative to the outer shaft before producing the outer stop.

In a first embodiment of the invention, it is provided that the outer stops are introduced in each case by two forming processes at two adjacent positions in the outer periphery of the outer shaft part, wherein the axes of the directions of introduction are located in a plane at right angles to the rotational axis of the outer shaft part and intersect at a point arranged radially between the rotational axis and the outer periphery of the outer shaft part. In this embodiment, two forming tools act at the positions of the outer periphery of the outer shaft part which are arranged adjacent to one another in the peripheral direction at a spacing of a few millimeters, wherein the two directions of introduction in each case form an angle of ca. 80° to the radial direction and accordingly an angle of ca. 160° to one another. In this arrangement, to a large extent the forces introduced by the forming tools cancel one another out, since they act almost opposingly to one another with an angle of ca. 160°. Thus only a very small force component, which acts radially in the direction of the rotational axis of the outer shaft part, remains. In this embodiment, therefore, the risk of deformation of the outer shaft part is significantly reduced and practically negligible.

In a second embodiment of the invention, the outer stop(s) is(are) introduced in each case by a forming process into a front face of the outer shaft part, wherein the axis of the direction of introduction is located in a plane enclosing the rotational axis of the outer shaft part. In this arrangement, the forming tool acts on the front face of the outer shaft part, wherein the forming forces comprise a large component which is introduced in the longitudinal direction into the outer shaft part. Advantageously, the radial component of the forming force acting on the outer shaft part is less than the total forming force.

In a third embodiment of the invention, the outer stop(s) is(are) introduced in each case by a forming process into the outer periphery of the outer shaft part, wherein the axis of the direction of introduction is located in a plane enclosing the rotational axis of the outer shaft part. The difference from the second exemplary embodiment is that in this case the forming tool acts on the outer peripheral surface of the outer shaft part and not on the front face. The effects on the reduction of the radial force are, however, the same as in the second exemplary embodiment.

In a fourth exemplary embodiment of the invention, the outer stop(s) is(are) introduced in each case by a forming process into a region of the outer shaft part enclosing the front face and the outer periphery, wherein the axis of the direction of introduction is located in a plane enclosing the rotational axis of the outer shaft part. The fourth exemplary embodiment may be regarded as a combination of the second and third exemplary embodiments since the forming tool in this case acts both on the front face and on the peripheral outer surface of the outer shaft part. The effects on the radial component of the deformation force and the advantages associated therewith are the same as in exemplary embodiments 2 and 3.

In a fifth exemplary embodiment of the invention, the outer stops are introduced in each case by a forming process into the respective end region of a longitudinal toothing on the inner face of the outer shaft part, wherein the axis of the direction of introduction is located in a plane arranged substantially tangentially to the outer face of the inner shaft part. This embodiment makes use of the fact that the longitudinal toothings of the outer shaft part are already present.

The invention further comprises a method for producing a pull-out safeguard of a steering shaft according to one of the embodiments described above, in which an inner shaft part provided with at least one axial inner stop, which projects radially outwards from its outer face, is inserted into an outer shaft part and subsequently at least one axial outer stop, which projects radially inwards from the inner face of the outer shaft part, is formed into the outer shaft part.

To achieve the object of producing a generic steering shaft for a motor vehicle, wherein the method is designed to be simple and deformations of the outer shaft part are to be avoided, it is proposed that the outer stop is introduced by a shaping process of a forming tool, wherein the axis of the direction of introduction, in which the forming tool is moved, forms an angle of more than 20° with the radial direction of the outer shaft part. Consequently, at the axial outer stop the front face of the outer shaft may be disposed at an angle of at least 20° but less than 80° relative to a radial direction of the outer shaft. The method reduces the radial component of the deformation force, whereby undesired deformations of the outer shaft part, which for example could produce an oval cross section of the outer shaft part, are prevented.

The risk of deformations and canting of the outer shaft part with the inner shaft part may be reduced by the measure that two outer stops, which are arranged in the peripheral direction at a spacing of 180°, are formed into the outer shaft part.

In a first preferred embodiment of the method according to the invention, two forming tools act at two adjacent positions of the outer periphery of the outer shaft part, wherein the axes of the two directions of introduction are located in a plane at right angles to the rotational axis of the outer shaft part and intersect at a point arranged radially between the rotational axis and the outer periphery of the outer shaft part. The result of this measure is that the two forming tools almost act in opposing directions to one another at the two positions of the outer periphery of the outer shaft part, wherein only a very small radial component acts in the direction of the rotational axis of the outer shaft part.

A second embodiment of the method according to the invention provides that the forming tool acts on a front face of the outer shaft part, wherein the axis of the direction of introduction is located in a plane enclosing the rotational axis of the outer shaft part. In this embodiment, a large component of the acting deformation force of the forming tool is introduced in the longitudinal direction into the tubular wall of the outer shaft part, which is only deformable with great difficulty in this direction. As a result, the radial force acting on the outer shaft part, which otherwise could bring about alterations to the cross section of the outer shaft part, is advantageously reduced.

A third exemplary embodiment of the method according to the invention has the same advantages as in the exemplary embodiment described above, according to which the forming tool acts on the outer periphery of the outer shaft part, wherein the axis of the direction of introduction is located in a plane enclosing the rotational axis of the outer shaft part.

In a fourth embodiment of the method according to the invention, it is provided that the forming tool acts on a region of the outer shaft part enclosing the outer periphery and the front face of the outer shaft part, wherein the axis of the direction of introduction is located in a plane enclosing the rotational axis of the outer shaft part. This combination of the method according to exemplary embodiments two and three results in the same advantages relative to the reduction of the radial component of the shaping force and thus the reduced probability of a deformation of the cross section of the outer shaft part.

In a fifth embodiment of the method according to the invention, it is provided that a fifth forming tool acts on an end region of a longitudinal toothing on the inner face of the outer shaft part, wherein the axis of the direction of introduction is located in a plane arranged substantially tangentially to the outer face of the inner shaft part. The forming force acting here has practically no radial component at all. In this case, it is particularly advantageous if two forming processes are carried out on two adjacent longitudinal toothings by two forming tools, wherein the respective directions of introduction form an angle of more than 90° to one another.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Figure 1:
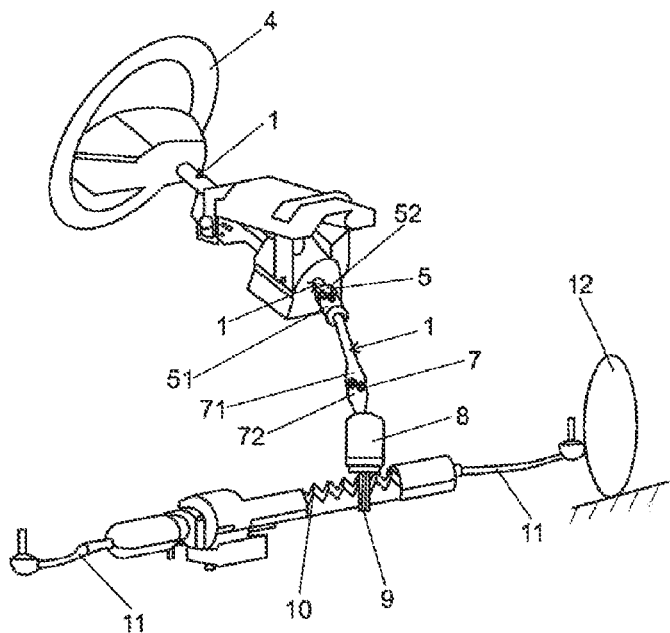
FIG. 1 is a schematic view of a steering device for motor vehicles with a multipart telescopable steering shaft.
Figure 2:
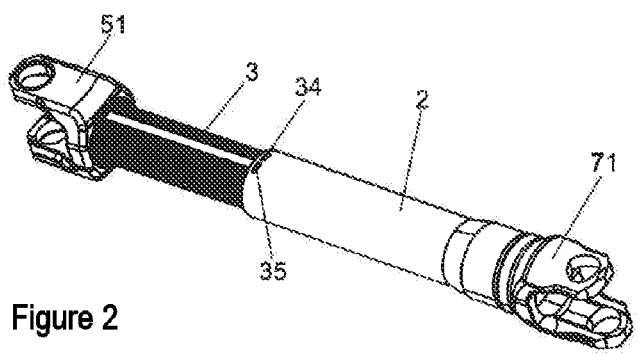
FIG. 2 is a schematic view of a telescopable steering shaft of the steering device with an inner shaft part which is displaceable in an outer shaft part.

A steering device for a motor vehicle is shown in FIG. 1, in which a steering shaft 1 is connected at one end to a steering wheel 4 and at its other end, via a rotary joint 5 configured as a universal joint, to a steering shaft 1. The steering shaft 1 is connected, via a further rotary joint 7 configured as a universal joint, to an input shaft of a steering gear 8, which acts via a pinion 9 on a toothed rod 10. The toothed rod 10 is displaced to the left or right according to the desired steering direction. The movement is transmitted via two track rods 11 to the steered vehicle wheels 12, in FIG. 1 only the left-hand front wheel thereof being shown. The rotary joints 5, 7 comprise in each case two forks 51, 52, 71, 72 and a cross pin mounted in the forks.

Figure 3:
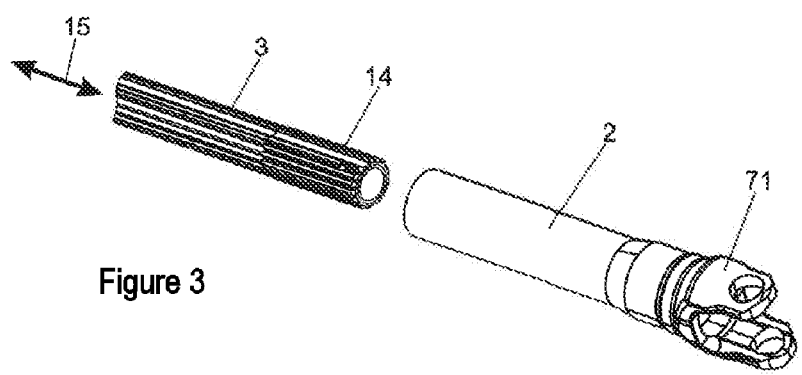
FIG. 3 is a schematic view similar to FIG. 2 in which the inner shaft part is pulled out of the outer shaft part.

In order to ensure a longitudinal adjustment of the steering wheel 4 in the direction of the rotational axis 15 of the steering shaft 1, the steering shaft 1 has a telescopable portion 2, 3 which is shown in FIGS. 1 and 3. The telescopable portion 2, 3 consists of an outer shaft part 2 into which an inner shaft part 3 is inserted. As may be identified most clearly in FIGS. 5 to 8, the outer shaft part 2 on its inner surface has a longitudinal toothing 13 which comes into engagement with a longitudinal toothing 14 on the outer surface of the inner shaft part 3 when the inner shaft part 3 is inserted into the outer shaft part 2. As a result, the inner shaft part 3 is axially displaceable in the outer shaft part 2 in the direction of the rotational axis 15, while the inner shaft part 2 and outer shaft part 3 are connected together in a torque-locking manner in order to transmit torques, which are introduced by the driver using the steering wheel 4, to the steering gear 8.

The inner shaft part 3 comprises on the outer surface a partial coating 510, also called an overmolding (FIG. 6), which is made of a plastic material and which cooperates with the longitudinal toothing 13 of the outer shaft part 2 and minimizes rotational play between the outer shaft part 2 and the inner shaft part 3. Alternatively, instead of the coating, a profile sleeve attached fixedly to the inner shaft 3 may also be arranged thereon. It is also conceivable and possible that the partial coating 510 is configured on the inner surface of the outer shaft part 2 or the profile sleeve is received in the outer shaft 2.

As is identified most clearly in FIGS. 4, 9, 11, 13 and 15, the inner shaft part 3 is provided with two inner stops 17, 18 which project radially outwards from its outer face 16 and which when viewed in the peripheral direction are arranged at a spacing of 180°. Accordingly, the outer shaft part 2 is provided with two axial outer stops 20 to 27, 43, 44 which project radially inwards from its inner face 19. The respective inner stops 17, 18 cooperate with the associated outer stops 20 to 27, 43, 44 such that the axial displacement path of the inner shaft part 2 is limited in the pull-out direction 28, since the respective inner stop 17, 18 strikes against the respective outer stop 20 to 27, 43, 44 and prevents the inner shaft part 2 from being completely pulled out of the outer shaft part 3.

Figure 12:
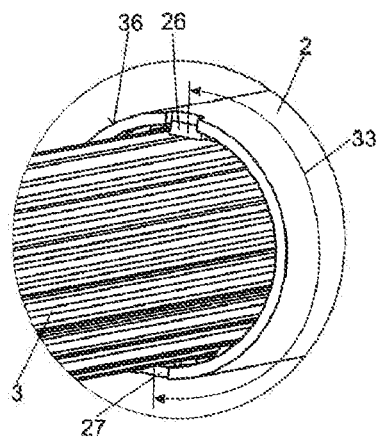
FIG. 12 is a perspective detailed view of an outer shaft part with the inserted inner shaft part and the pull-out safeguard, in a fourth embodiment.

The present invention relates to advantageous embodiments of the respective outer stops 20 to 27, 43, 44 and methods for the production thereof. It is common to all embodiments that the outer stops 20 to 27, 43, 44 are introduced by a forming process into an end portion 29 of the outer shaft part 2, wherein the respective axis of the direction of introduction 30 in each case forms an angle 32 of more than 20° with the radial direction 31 of the outer shaft part 2. Consequently, at some axial outer stops the front face 42 of the outer shaft 2 may be disposed at an angle 32 of at least 20° but less than 80° relative to a radial direction 31 of the outer shaft 2. Moreover, it is common to the exemplary embodiments that in each case two outer stops 20 to 27, 43, 44 are arranged on the outer shaft part 2 in the peripheral direction 33 at a spacing of 180°. This is illustrated by way of example in FIG. 12.

If the inner shaft part 3 is pulled out of the outer shaft part 2 in the pull-out direction 28, the inner stops 17, 18 of the inner shaft part 3 strike against the outer stops 20 to 27, 43, 44 of the outer shaft part 2, whereby the pull-out movement is limited and stopped. As a result, the inner shaft part 3 is prevented from being inadvertently pulled out entirely from the outer shaft part 2.

Figure 4:
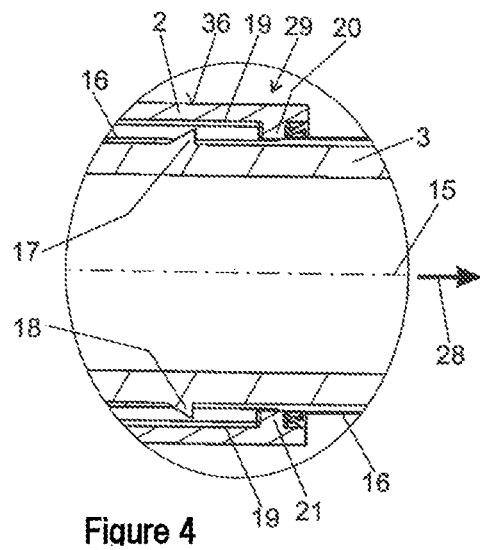
FIG. 4 is a sectional detailed view of a pull-out safeguard of the outer shaft part and the inner shaft part.
Figure 5:
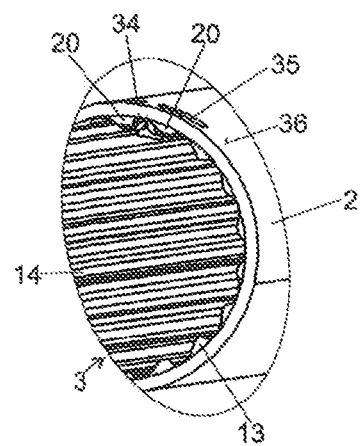
FIG. 5 is a perspective view of a pull-out safeguard between the outer shaft part and the inner shaft part.
Figure 6:
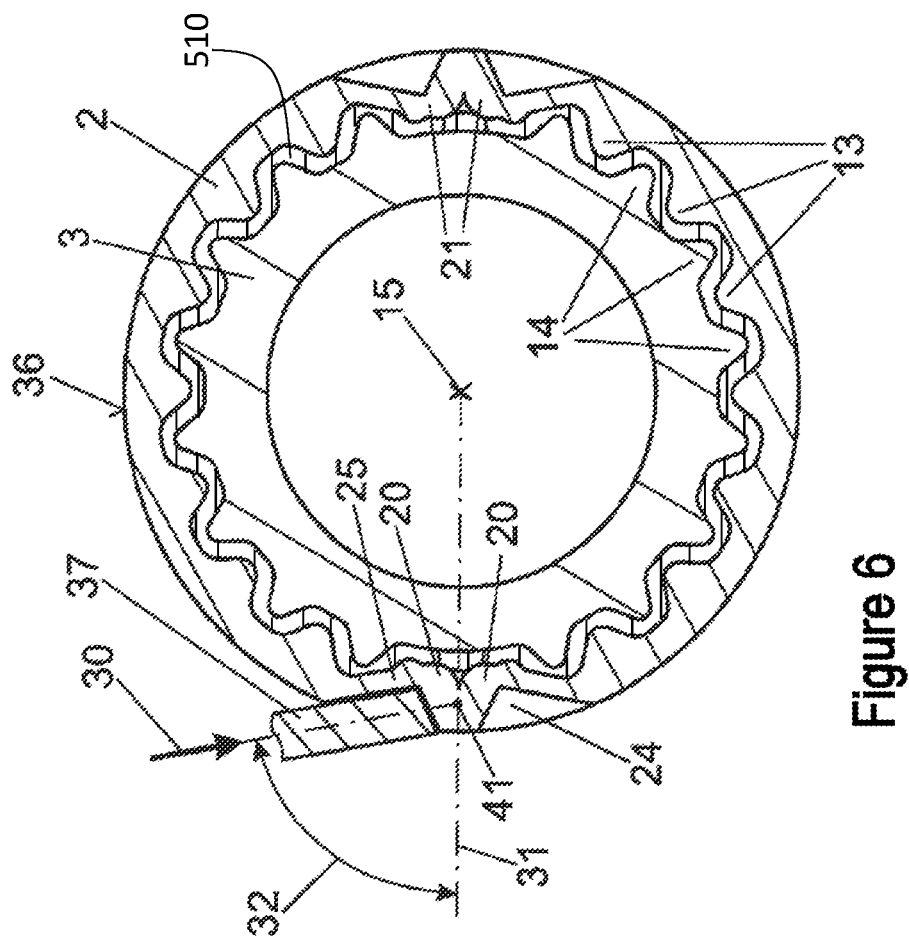
FIG. 6 is a cross-sectional view through an outer shaft part with the inserted inner shaft part during the forming of an outer stop in the outer shaft part.

In a first exemplary embodiment of the invention which is shown in FIGS. 4 to 6, the outer stops 20, 21 in each case are introduced by two forming processes at two adjacent positions 34, 35 into the outer periphery 36 of the outer shaft part 2 by a shaping process, by means of a first forming tool 37, wherein the axes of the directions of introduction 30 form an angle 32 of approximately 80° with the radial direction 31.

Moreover, the opposing directions of introduction 30 of the two forming tools 37 are aligned such that they are located in a plane at right angles to the rotational axis 15 of the outer shaft part 2 and intersect at a point 41 arranged radially between the rotational axis 15 and the outer periphery 36 of the outer shaft part 2. As a result, the two directions of introduction 30 are at an angle of approximately 160° to one another, so that the forces of the two forming tools 37 acting in the direction of introduction 30 only act to a very small degree in the radial direction 31.

Figure 6A:
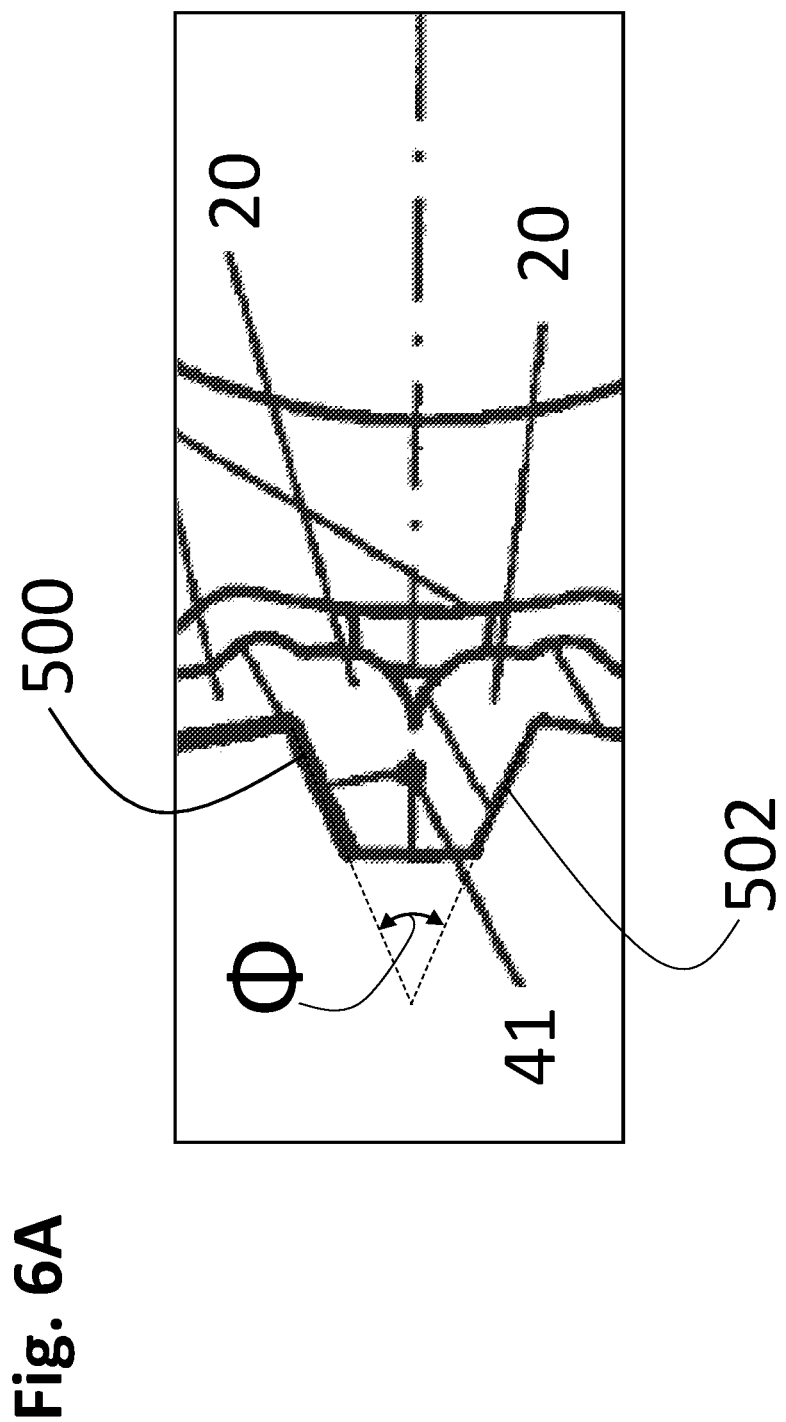
FIG. 6A is an enlarged detail view from FIG. 6 depicting an axial outer stop on an outer periphery of the outer shaft that projects away from a longitudinal axis of the outer shaft such that two surfaces of the axial outer stop form an acute angle relative to one another.

FIG. 6A shows how the outer stop 20 on the outer periphery 36 of the outer shaft 2 may project away from a longitudinal axis (or rotational axis 15) of the outer shaft 2 such that two surfaces 500, 502 of the axial outer stop 20 form an acute angle (I) relative to one another.

Figure 7:
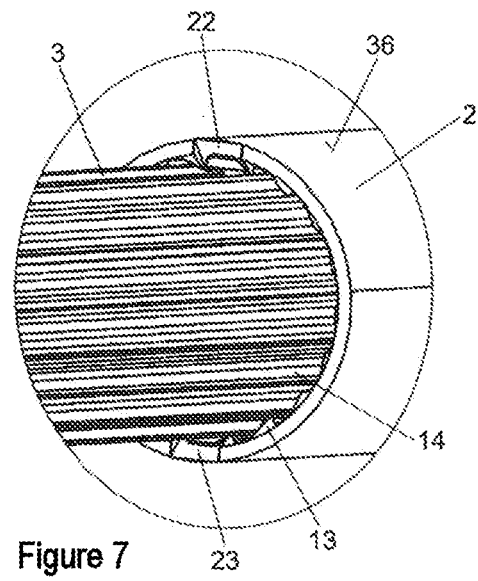
FIG. 7 is a perspective detailed view of a pull-out safeguard between the outer shaft part and the inner shaft part, in a second embodiment.
Figure 8:
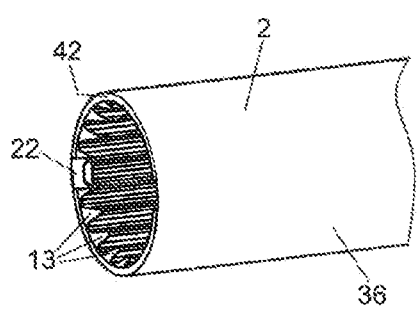
FIG. 8 is a perspective detailed view of an outer shaft part with an outer stop formed therein.
Figure 9:
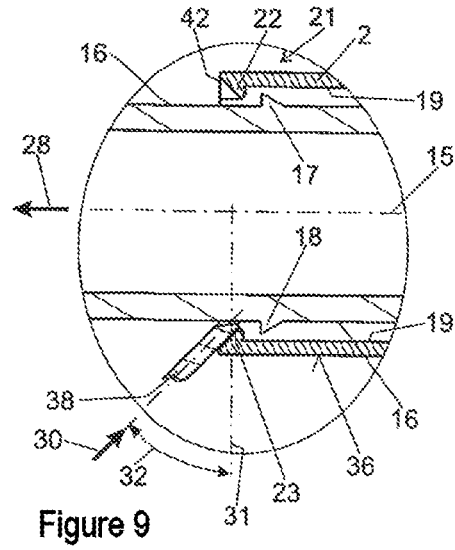
FIG. 9 is a detailed view of a longitudinal section through an outer shaft part with the inner shaft part inserted therein during the forming of an outer stop in the outer shaft part, in a second embodiment.

In the second exemplary embodiment which is shown in FIGS. 7-9, the two outer stops 22, 23 are formed in the front face 42 of the outer shaft part 2 by means of a second forming tool 38, wherein the axis of the direction of introduction 30 is located in a plane enclosing the rotational axis 15 of the outer shaft part 2. This plane corresponds to the paper plane in FIG. 9.

Figure 10:
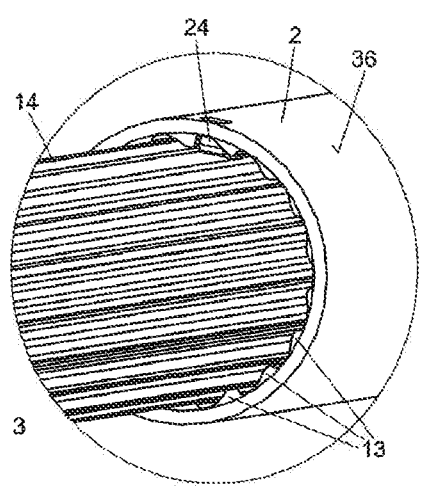
FIG. 10 is a perspective detailed view of an outer shaft part with the inserted inner shaft part and a pull-out safeguard, in a third embodiment.
Figure 11:
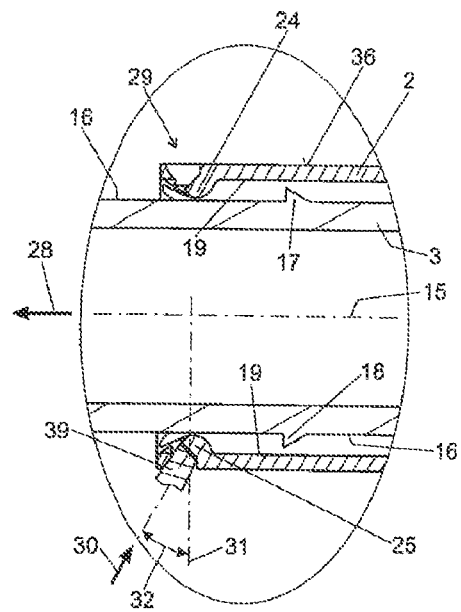
FIG. 11 is a partial view of the outer shaft part with the inserted inner shaft part in longitudinal section during the forming of an outer stop in the outer shaft part, in a third embodiment.

In the third exemplary embodiment shown in FIGS. 10 and 11, the two outer stops 24, 25 have been introduced by forming in the outer periphery 36 of the outer shaft part 2, wherein a third forming tool 39 is moved in the direction of introduction 30. In this case, the direction of introduction 30 is located in a plane which encloses the rotational axis 15 of the outer shaft part 2 and which corresponds in FIG. 11 to the paper plane.

Figure 13:
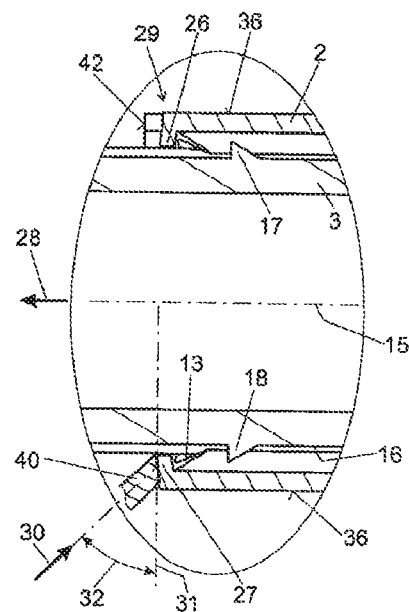
FIG. 13 is a detailed view of an outer shaft part with the inserted inner shaft part in longitudinal section during the forming of an outer stop in the outer shaft part, in a fourth embodiment.

In a fourth exemplary embodiment of the invention for producing the outer stops 26, 27, a fourth forming tool 40 acts on a region of the outer shaft part 2 which encloses both the outer periphery 36 and the front face 42 of the outer shaft part 2. In this case, the axis of the direction of introduction 30 is again located in a plane which encloses the rotational axis 15 of the outer shaft part 2 and which corresponds in FIG. 13 to the paper plane. As also shown in FIG. 13, at least one planar surface (i.e., the right-most surface in FIG. 13) of the inner stop 18 projects towards an axial end of the outer shaft 2 through which the inner shaft 3 extends. Still further, as demonstrated by way of the example shown in FIGS. 12 and 13, the inner stop 18 may be integral with the inner shaft 3 so as to form a one-piece construction with the inner shaft 3. The inner stop 18 may also be independent of any splines and/or toothings of the inner shaft 3.

Figure 14:
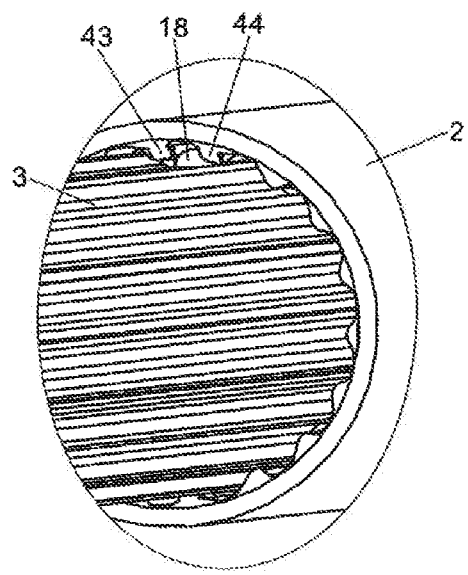
FIG. 14 is a perspective detailed view of an outer shaft part with the inserted inner shaft part and the pull-out safeguard, in a fifth embodiment.
Figure 15:
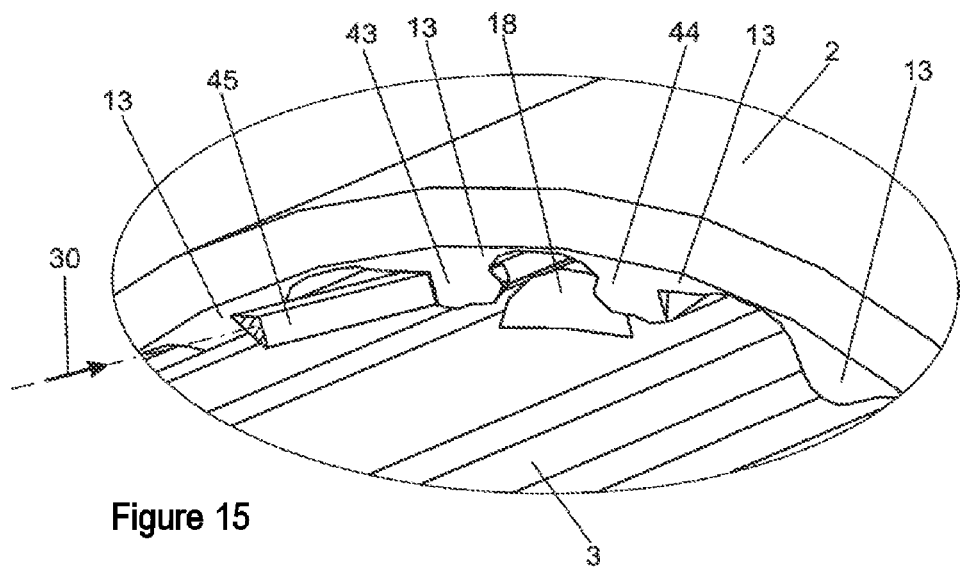
FIG. 15 is an enlarged detailed view of FIG. 14 with a forming tool.
Figure 16:
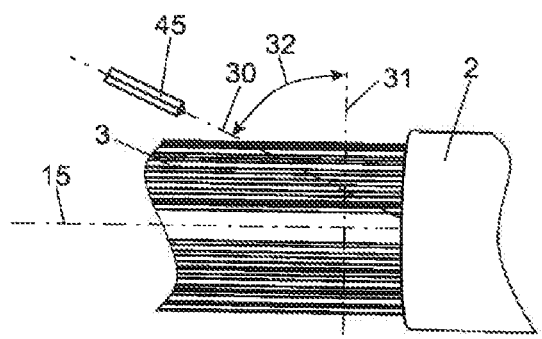
FIG. 16 is a plan view of the outer shaft part with the inserted inner shaft part of FIG. 14 with the forming tool.

In a fifth exemplary embodiment of the invention, as is shown in FIGS. 14 to 16, for producing the outer stops 43, 44 a fifth forming tool 45 acts on an end region of the longitudinal toothing 13 which is located on the inner face 19 of the outer shaft part 2. The axis of the direction of introduction 30 in this case is located in a plane which is displaced in parallel relative to the rotational axis 15 of the inner shaft part 3 and is arranged substantially tangentially to the outer face 16 of the inner shaft part 3. This plane thus extends through the region between the inner shaft part 3 and the outer shaft part 2, wherein the respective longitudinal toothings 13, 14 engage in one another. Preferably, two forming tools 45 act at the same time on two end regions of two adjacent longitudinal toothings, wherein the respective directions of introduction 30 in the aforementioned plane form an angle of more than 90° to one another.

Differently shaped outer stops 20 to 27, 43, 44 are produced in all of the exemplary embodiments, but it is common to all of the exemplary embodiments that the type of production thereof is not able to lead to significant deformation of the entire cross section of the outer shaft part 2, namely a reshaping of the circular cross section into an oval cross section. As a result, it is prevented that the inner shaft part 3 becomes jammed in the deformed outer shaft part 2 and that greater forces are necessary for displacement in the direction of the rotational axis 15. The methods according to the invention permit inexpensive production of the outer stops 20 to 27, 43, 44 without comprising the drawbacks of the prior art.

LIST OF REFERENCE NUMERALS

1 Steering shaft
2 Outer shaft part
3 Inner shaft part
4 Steering wheel
5 Rotary joint
7 Rotary joint
8 Steering gear
9 Pinion
10 Toothed rod
11 Track rods
12 Vehicle wheel
13 Longitudinal toothing
14 Longitudinal toothing
15 Rotational axis
16 Outer face
17 Inner stop
18 Inner stop
19 Inner face
20 Outer stop
21 Outer stop
22 Outer stop
23 Outer stop
24 Outer stop
25 Outer stop
26 Outer stop
27 Outer stop
28 Pull-out direction
29 End portion
30 Direction of introduction
31 Radial direction
32 Angle
33 Peripheral direction
34 Position
35 Position
36 Outer periphery
37 Forming tool
38 Forming tool
39 Forming tool
40 Forming tool
41 Point
42 Front face
43 Outer stop
44 Outer stop
45 Forming tool

What is claimed is:

1. A steering shaft for a motor vehicle, comprising:
an outer shaft, and
an inner shaft disposed in the outer shaft in a torque-locking and axially displaceable manner, the inner shaft having an axial inner stop that projects radially outwards from an outer face of the inner shaft and which, when the inner shaft is pulled out of the outer shaft, is positioned to strike against an axial outer stop that projects radially inwards from an inner face of the outer shaft to delimit the travel of the inner shaft in the outer shaft in a pull-out direction,
wherein the axial outer stop is disposed at a front face and an outer periphery of the outer shaft,
wherein at least one planar surface of the axial inner stop projects towards an axial end of the outer shaft through which the inner shaft extends.

2. A steering shaft for a motor vehicle, comprising:
an outer shaft, and
an inner shaft disposed in the outer shaft in a torque-locking and axially displaceable manner, the inner shaft having an axial inner stop that projects radially outwards from an outer face of the inner shaft and which, when the inner shaft is pulled out of the outer shaft, is positioned to strike against an axial outer stop that projects radially inwards from an inner face of the outer shaft to delimit the travel of the inner shaft in the outer shaft in a pull-out direction, wherein the axial outer stop is disposed at a front face and an outer periphery of the outer shaft, wherein at the axial outer stop the front face of the outer shaft is disposed at an angle of at least 20° but less than 80° relative to a radial direction of the outer shaft.

3. A steering shaft comprising:

an outer shaft;

an inner shaft disposed in the outer shaft in a torque-locking and axially displaceable manner, the inner shaft having an axial inner stop that projects radially outwards from an outer face of the inner shaft and which, when the inner shaft is pulled out of the outer shaft, is positioned to strike against an axial outer stop that projects radially inwards from an inner face of the outer shaft to delimit the travel of the inner shaft in the outer shaft in a pull-out direction; and an overmolding comprised of plastic disposed on an outer surface of the inner shaft, wherein the overmolding cooperates with a longitudinal toothing of the outer shaft, wherein on an outer periphery of the outer shaft the axial outer stop projects away from a longitudinal axis of the outer shaft such that two surfaces of the axial outer stop form an acute angle relative to one another.

4. A method for producing a pull-out safeguard of a steering shaft that includes an outer shaft and an inner shaft disposed in the outer shaft in a torque-locking and axially displaceable manner, the inner shaft having an axial inner stop that projects radially outwards from an outer face of the inner shaft and which, when the inner shaft is pulled out of the outer shaft, is positioned to strike against an axial outer stop that projects radially inwards from an inner face of the outer shaft to delimit the travel of the inner shaft in the outer shaft in a pull-out direction, wherein the axial outer stop is disposed at a front face and an outer periphery of the outer shaft, the method comprising:

forming, on the inner shaft, the axial inner stop, inserting the inner shaft into the outer shaft, and forming with a first forming tool after said inserting step, on the outer shaft, the axial outer stop, wherein the axial outer stop is introduced by a forming process into an end portion of the outer shaft in a direction, wherein an axis of the direction of introduction forms an angle of more than 20° but less than 80° relative to a radial direction of the outer shaft.

5. The method of claim 4, including forming two outer stops arranged in a peripheral direction at a spacing of 180° onto the outer shaft.

6. The method of claim 4, wherein the first forming tool acts on a front face of the outer shaft, wherein the axis of the direction of introduction is located in a plane enclosing a rotational axis of the outer shaft.

7. The method of claim 4 wherein the first forming tool acts on an outer periphery of the outer shaft, wherein the axis of the direction of introduction is located in a plane enclosing a rotational axis of the outer shaft.

8. The method of claim 4 wherein the first forming tool acts on a region of the outer shaft enclosing an outer periphery and a front face of the outer shaft, wherein the axis of the direction of introduction is located in a plane enclosing a rotational axis of the outer shaft.

* * * * *